United States Patent
Ter Beest, III et al.

(10) Patent No.: US 10,607,102 B2
(45) Date of Patent: *Mar. 31, 2020

(54) VIDEO PROCESSING TECHNIQUE FOR 3D TARGET LOCATION IDENTIFICATION

(71) Applicant: BOOZ ALLEN HAMILTON INC., McLean, VA (US)

(72) Inventors: James J. Ter Beest, III, McLean, VA (US); Evan R. Montgomery-Recht, McLean, VA (US)

(73) Assignee: BOOZ ALLEN HAMILTON INC., McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/150,018

(22) Filed: Oct. 2, 2018

(65) Prior Publication Data

US 2019/0156505 A1    May 23, 2019

Related U.S. Application Data

(63) Continuation of application No. 15/609,150, filed on May 31, 2017, now Pat. No. 10,089,751.

(51) Int. Cl.
| | | |
|---|---|---|
| *G06K 9/00* | (2006.01) | |
| *G06K 9/46* | (2006.01) | |
| *H04N 7/18* | (2006.01) | |
| *G06T 7/246* | (2017.01) | |
| *G06T 7/55* | (2017.01) | |

(52) U.S. Cl.
CPC ....... *G06K 9/4604* (2013.01); *G06K 9/00771* (2013.01); *G06T 7/246* (2017.01); *G06T 7/55* (2017.01); *H04N 7/181* (2013.01); *G06T 2207/20088* (2013.01)

(58) Field of Classification Search
CPC . G06T 7/246; G06T 7/55; G06T 2207/20088; G06K 9/4604; G06K 9/00771; H04N 7/181
See application file for complete search history.

(56) References Cited

U.S. PATENT DOCUMENTS

| | | | | |
|---|---|---|---|---|
| 6,400,364 | B1* | 6/2002 | Akisada | G06T 15/20 345/420 |
| 9,129,181 | B1* | 9/2015 | Nathan | G06K 9/3241 |
| 2010/0265048 | A1* | 10/2010 | Lu | B60Q 9/005 340/435 |
| 2014/0055621 | A1* | 2/2014 | Shirani | H04N 7/18 348/159 |
| 2014/0176720 | A1* | 6/2014 | Anderson | H04N 7/181 348/157 |

* cited by examiner

*Primary Examiner* — Amara Abdi
(74) *Attorney, Agent, or Firm* — Buchanan Ingersoll & Rooney PC

(57) ABSTRACT

A method and system for determining the location of objects using a plurality of full motion video cameras where the location is based on the intersecting portions of a plurality of three-dimensional shapes that are generated from the video data provided by the cameras. The three-dimensional shapes include two-dimensional shapes that contain predetermined traits in each of the frames of the video signals.

18 Claims, 9 Drawing Sheets

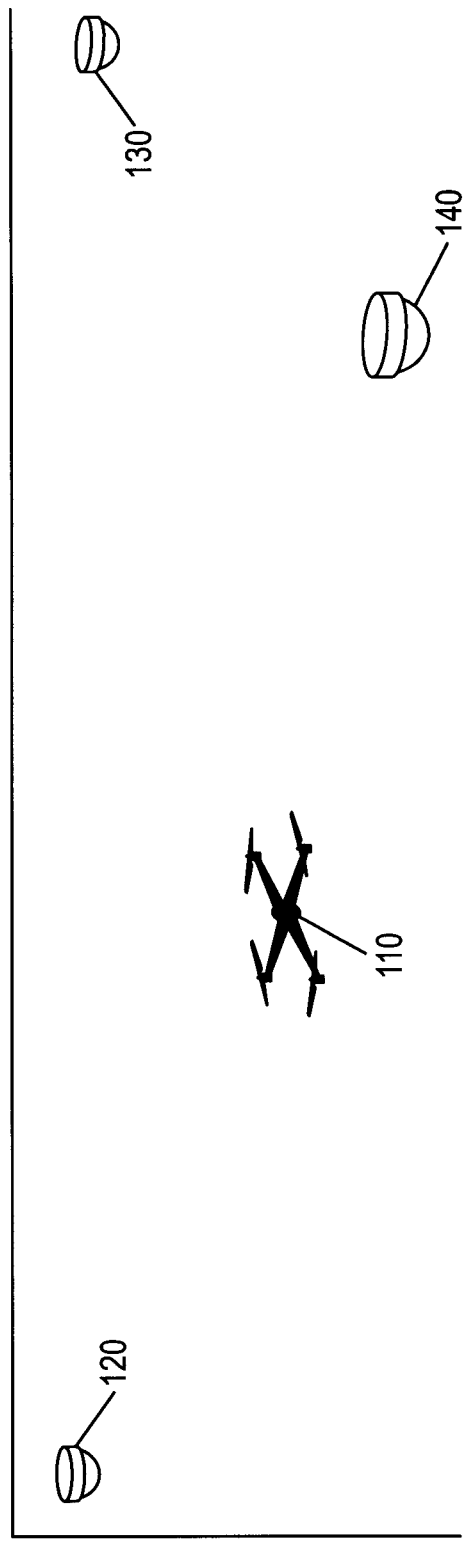

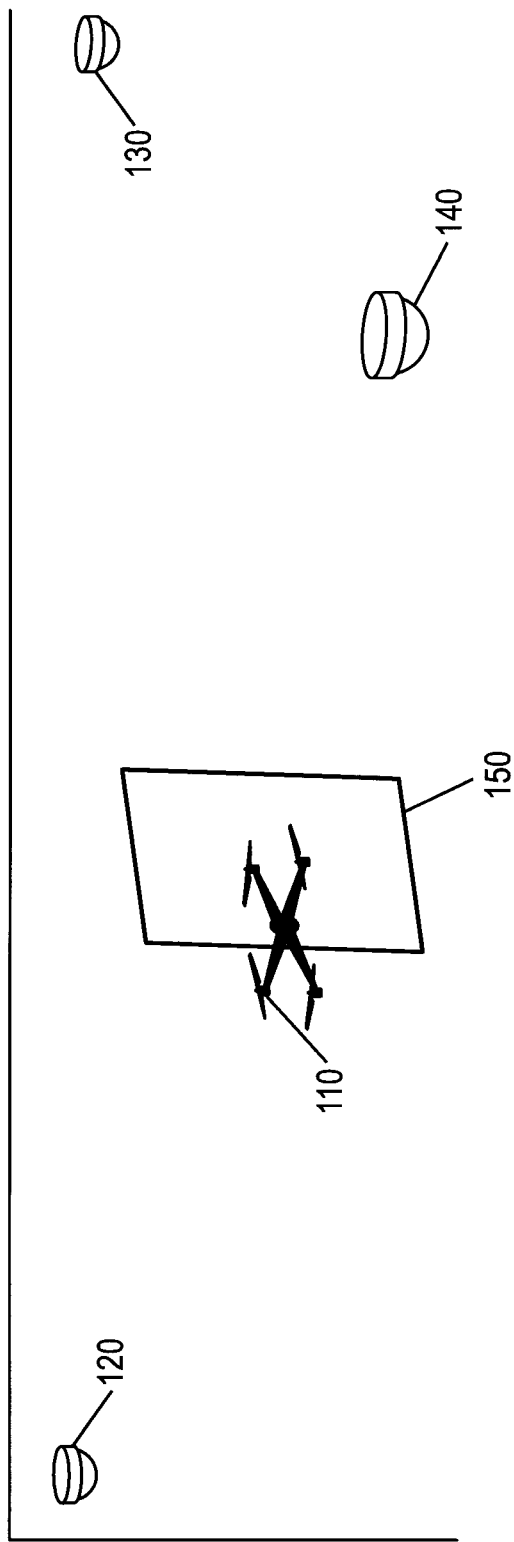

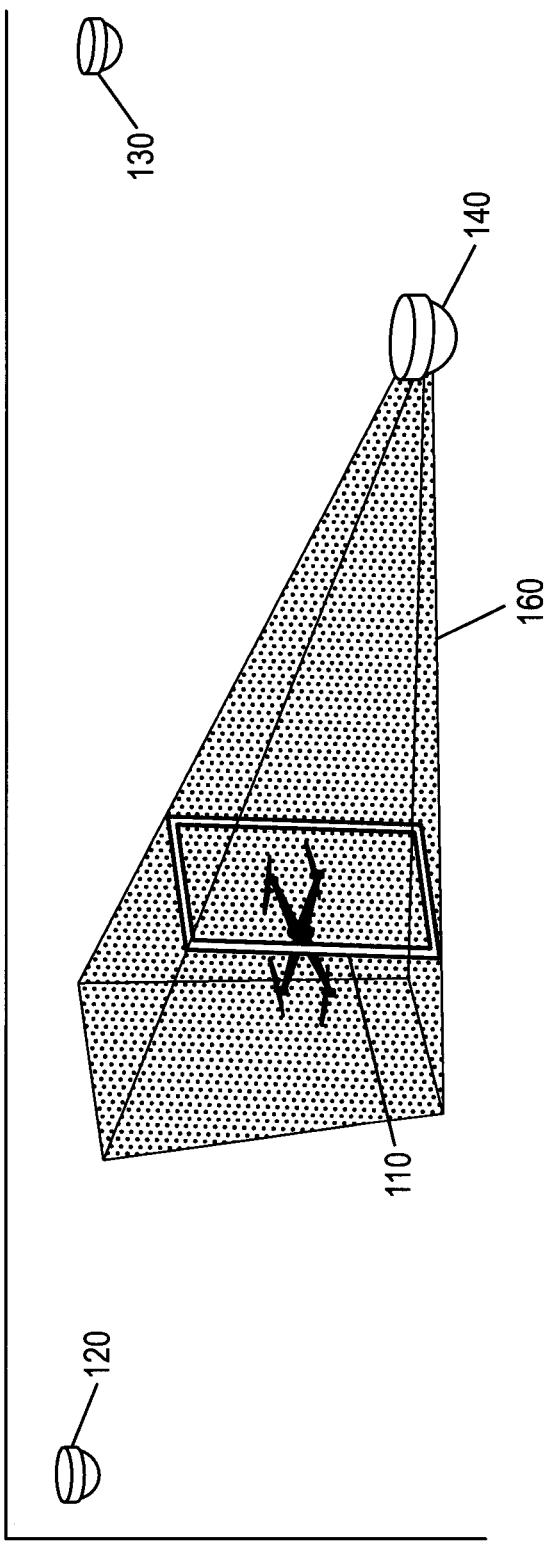

VIDEO PROCESSING TECHNIQUE FOR 3D TARGET LOCATION IDENTIFICATION

FIELD

The field of this disclosure relates to video processing, and more specifically a technique to determine the location of an object using a plurality of full motion video cameras.

BACKGROUND

It is often desirable to detect the location of physical objects in a particular area. Maintaining situational awareness of the physical objects, particularly the objects that are important to operations within an industry, is desirable so that key assets are not improperly removed or displaced. Moreover, situational awareness of physical objects can provide information that can later be used to optimize operations in an industry. Areas where such situational awareness are desirable include casinos, sports venues, construction sites, factories, military bases, and retail stores, for example.

Known techniques for tracking physical objects employ passive or active sensor observations that are used to calculate or report an object's physical location. At times, however, the physical object whose location is to be detected are passive objects that require external observations using lasers, cameras, radar, sonar, induction sensors, infrared sensors, or other known sensors. Other times, even when the physical object includes the capability to derive and transmit its location, circumstances may arise where these capabilities are unavailable due to cost issues or due to interference by external environmental factors.

SUMMARY

Embodiments of a method for determining the location of objects include receiving a video signal from each of a plurality of full motion video cameras observing an area, identifying predetermined traits in frames of each video signal, the predetermined traits being associated with the objects, demarcating a portion of the video frame with a two-dimensional shape where the demarcated portion contains the identified predetermined traits in the frames of each video signal, assigning geospatial information to the two-dimensional shape containing the identified predetermined traits where the geospatial information represents a location of a camera that acquired the frame, defining a plurality of three-dimensional shapes where each three-dimensional shape extends from a distance beyond the objects to the location of the camera for each frame of the video signal including the predetermined traits and each three-dimensional shape includes a two-dimensional shape with the geospatial information, identifying each of the full motion video cameras associated with overlapping coverage of the area that provided the video signal where the two-dimensional shape demarcates the identified predetermined traits, calculating intersecting portions of the plural three-dimensional shapes by applying an intersect function to the defined three-dimensional shapes obtained from the full motion video cameras with overlapping coverage of the area where the intersect function outputs an intersecting shape, and determining a center of the intersecting shape where the center of the intercepting shape is a determined location of the object.

Embodiments of a system for determining the location of an object include a plurality of full motion video cameras observing an area, a computing device configured to define three-dimensional shapes, and an intersecting shape computing device configured to define an intersecting shape. The computing device configured to define three-dimensional shapes receives a video signal from each of the plurality of full motion video cameras, identifies predetermined traits in frames of each video signal where the predetermined traits are associated with the objects, demarcates a portion of the video frame with a two-dimensional shape where the demarcated portion contains the identified predetermined traits in the frames of each video signal, assigns geospatial information to the two-dimensional shape containing the identified predetermined traits where the geospatial information represents a location of a camera that acquired the frame, defines a plurality of three-dimensional shapes where each three-dimensional shape extends from a distance beyond the objects to the location of the camera for each frame of the video signal including the predetermined traits where each three-dimensional shape includes a two-dimensional shape with the geospatial information, and stores the defined three-dimensional shapes.

These and other embodiments are described herein.

BRIEF DESCRIPTION OF THE DRAWINGS

FIG. 1 depicts an embodiment of the system and a physical object.

FIG. 2 depicts the embodiment of the system, a physical object, and a two-dimensional shape.

FIG. 3A depicts the embodiment of the system, a physical object, a two-dimensional shape, and a three-dimensional shape.

DETAILED DESCRIPTION OF THE INVENTION

Figure 3B:
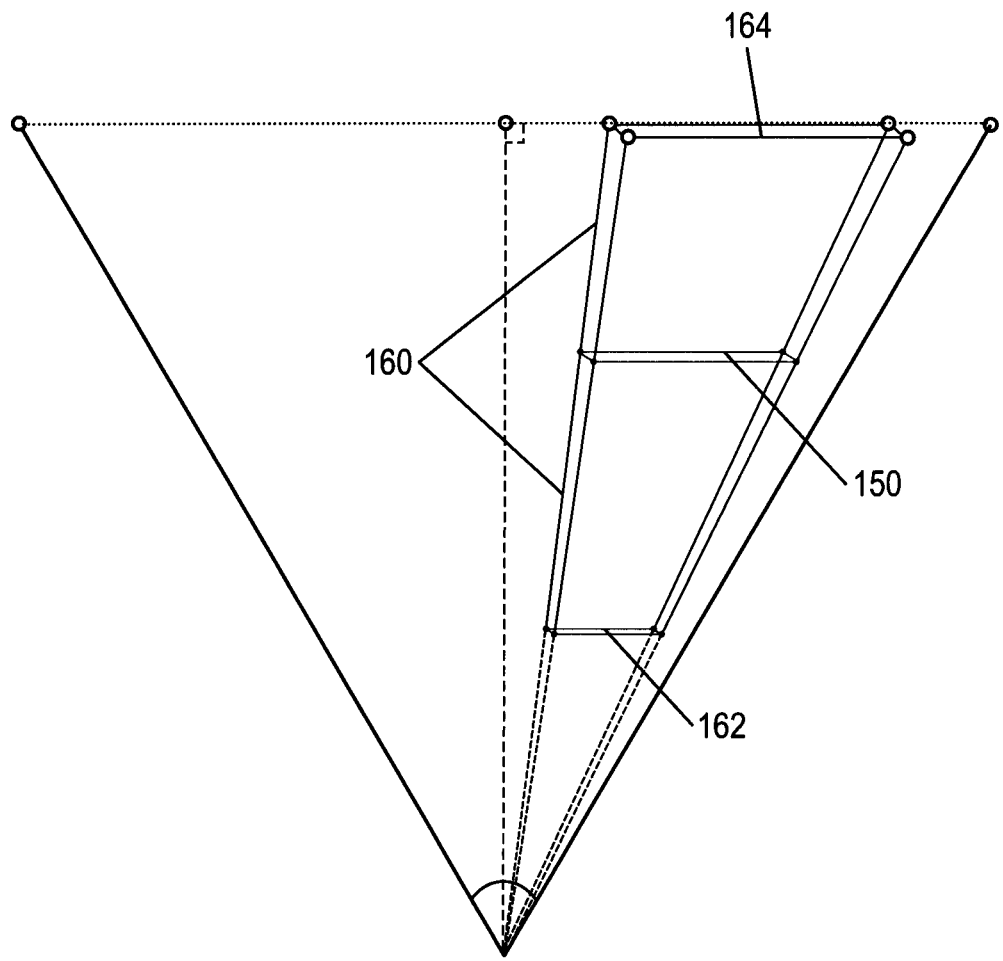
FIG. 3B depicts a three-dimensional shape defined by an embodiment of the system.

In many fields, tracking of active or passive objects in an area is desirable so that situational awareness can be maintained. The present disclosure describes a technique for determining the location of an object using video obtained from a plurality of full motion video cameras that does not require the transmission of large amounts of data in order to define the location of the object to be tracked.

FIG. 1 depicts a physical object 110 that is within range of three full motion video cameras 120, 130, 140. Each of the cameras 120, 130, 140 capture video and provide a video signal. The cameras 120, 130, 140 are deployed in a variety of locations and each camera 120, 130, 140 observes the object 110 from different perspectives. Through the use of the technique described herein, the cameras 120, 130, 140 need not share characteristics such as focal length, sensor size, and other features that are commonly shared by video monitoring systems. Instead, the technique relies on cameras 120, 130, 140 that provide video data of an area being observed. Moreover, as described in detail below, the cameras 120, 130, 140 may capture video data using information beyond what is perceivable by human vision. For example, a camera that relies on infrared to perceive an area may capture information regarding the relative heat levels, and a full motion video camera may capture information regarding motion that is also perceivable by human vision. By allowing for the use of heterogeneous video sources, the techniques described here can be applied onto a large corpus of video and other data which will improve the accuracy of the location derived from such data. Examples of the variety of video sources include personal cell phones, cameras with wide angle or zoom lenses, digital single-lens reflex cameras, closed circuit video cameras, cameras mounted onto vehicles such as aerial drones, infrared cameras, and other devices that can provide video data or other useful information for determining the location of objects for a particular area.

Examples of video sources that may provide information that is beyond what is perceivable by human vision include infrared cameras that capture the heat being emitted by objects in the area. In other embodiments, the video sources may rely on ultraviolent light. Varieties of cameras perceiving different aspects of areas may be useful in areas where obstructions or other types of interference may exist that can compromise the ability of full motion video cameras to reliably observe. Infrared cameras may, for example, continue to observe a dark unlit area whereas a full motion video camera may require external lighting. In still further embodiments, the cameras may include the ability to apply different types of filters so that the cameras can interchangeably operate in the visible, infrared, or ultraviolet spectrum. As discussed, these examples of types of cameras that can capture light in different wavelengths may be employed in a system with full motion video cameras that can capture light perceivable by human vision to further improve the determination of the location of an object 110. A variety of lens types may be employed with the cameras and include, but are not limited to, micrography lenses, macro lenses, normal, wide-angle, and telephoto lenses, and fisheye lenses. A variety of cameras types may be employed as well including traditional single-lens cameras, omnidirectional cameras with mirrors to produce a 360° image using one sensor and outputting a two-dimensional monoscopic image, a camera with multiple camera sensors that provide different viewpoints that are then stitched together, ball or spherical cameras where multiple camera sensors are stitched together to form a large image for virtual or augmented reality uses, high speed/slow motion cameras, and light detection and ranging cameras that observe the reflected pulses of light used to illuminate an object. In addition, certain sensors may be employed to perceive different aspects of the electromagnetic spectrum. For example, certain sensors may be employed to observe the blue portion of the spectrum (approximately 450-520 nm), the green portion of the spectrum, (approximately 515-600 nm), the red portion of the spectrum (approximately 600-690 nm), the infrared portions of the spectrum (approximately 750-900 nm, 1500-1750 nm, and 2080-2350 nm), or the thermal infrared portions of the spectrum (approximately 10,400-12,500 nm) where reflected heat may be observed. In addition, some embodiments may apply hyperspectral imaging to spatially resolved vibrational spectroscopic techniques for purposes to visualize airborne particulates.

In at least some embodiments, the cameras 120, 130, 140 possess the ability to provide locally-derived timestamps so that each frame captured by the cameras 120, 130, 140 is given an appropriate timestamp. Certain embodiments provide these locally-derived timestamps in the low-millisecond range. In at least some embodiments, the cameras 120, 130, 140 utilize a timestamp that is based on Coordinated Universal Time (UTC). In certain embodiments, the cameras 120, 130, 140 include the capability to synchronize with a reliable timing source such as a Network Time Protocol (NTP) server, a signal from a Global Navigation Satellite System (GNSS) such as the Global Positioning System (GPS), Galileo, the Global Navigation Satellite System (GLOSNASS), BeiDou, as well as a signal from the Iridium Satellite Time Location (STL) service, or a signal from a terrestrial-based timing source such as Enhanced Long-Range Navigation (eLORAN). Still further embodiments, however, do not utilize cameras 120, 130, 140 that include the ability to timestamp the video data. Rather, the cameras 120, 130, 140 provide the video data over a network to a server where the video frames are synchronized by a timestamp generated by the server. Such a system where the video data is synchronized by the server may include a network capable of providing the video data from the plurality of cameras in a manner where the data arrives at the server where the timestamp is generated by the server. It should be noted that in such an embodiment, the server may perform the additional processing set forth by this disclosure and is not limited to merely synchronizing the video frames by a timestamp.

In other embodiments, the cameras 120, 130, 140 may include the ability to provide information including camera position, azimuth, inclination, and focal length. Data from a GPS chip may be utilized to provide this information when the cameras 120, 130, 140 are able to reliably receive GPS signals. In other embodiments, the cameras 120, 130, 140 may utilize accelerometers, gyroscopes, or other sensors to provide position, azimuth, and inclination data. One example of such an embodiment of a camera 120, 130, 140 is a smartphone device with a built in GPS chip. In still further embodiments, the cameras 120, 130, 140 may utilize other positioning techniques such as Assisted GPS (A-GPS), Differential GPS (D-GPS), Galileo, GLONASS, BeiDou, or eLORAN. The cameras 120, 130, 140 need not provide all this information, however. In situations where the cameras 120, 130, 140 are static, for example, the camera position, azimuth, and inclination may be configured by an operator when deploying the camera. The information including camera position, azimuth, and inclination may be defined in an absolute coordinate system or a relative coordinate system. In at least some embodiments, the camera serves as the origin for the coordinate system.

The physical object 110 to be tracked operates in the field of view of multiple cameras 120, 130, 140. The physical object 110 may actively broadcast position information that can be utilized to determine the position of the physical object 110. These signals can, however, be affected by interference or obstructions in the environment and therefore may not continually provide an accurate position for the physical object 110. In some situations, the physical object 110 may include specific traits that facilitate the identification and tracking of the object 110 using video cameras. For example, the object 110 may include a barcode, image, text, or other components and/or indicia that facilitate identification by video. In some circumstances, the object 110 is a human whose face may facilitate identification by video. The object 110 need not, however, include such components or indicia.

In the system depicted in FIG. 1, the three cameras 120, 130, 140 provide video data that includes the physical object 110. By virtue of the different positions of the cameras 120, 130, 140, the video data provides observations of the physical object 110 from different perspectives. For example, one camera 120, 130, 140 may be placed in each corner of a room and oriented so that the field of view of each camera includes the center of the room. In some situations, the cameras 120, 130, 140 may be placed in different planes. For example, one camera 120 may be placed in a corner towards the ceiling whereas the other cameras 130, 140 may be placed in corners towards the floor so that different observation angles are provided. Although three cameras 120, 130, 140 are depicted in FIG. 1, the technique described here is not limited to including only three cameras and may include significantly more cameras. Additional cameras may be particularly useful in areas where obstructions may exist that can prevent certain cameras from continuously monitoring an area. For example, if structural features like columns exist in the room, additional cameras may be placed so that all sides of the column are continuously observed by at least one camera. By including additional cameras and by considering additional video data obtained from different locations, the described technique can improve the tracking and the determination of the location of the physical object 110. Moreover, placement of the cameras may depend on the type of lens and/or camera being used. For example, infrared cameras may need to be spaced from each other and from interfering sources a certain minimum distance so that data is provided. In other embodiments, the placement of the cameras may depend on the types of objects expected to be observed. For example, the spacing and placement of cameras for observing an area where humans are traversing may be very different from the spacing and placement of cameras for observing an area where multiple aircraft are operating.

Using the video data from the cameras 120, 130, 140, a computing device detects predetermined traits within the video data such as an object's motion. For example, a certain grouping of pixels moving across 20% of a field of view of a camera between frames of data captured by the camera may be recognized as movement fitting the predetermined trait of rapid movement. The computing device may also recognize specific traits of a physical object 110 in the video data such as human facial features, graphical markers or icons, and other indicia that are specific to certain objects. Such recognition of traits may include recognition where the cameras 120, 130, 140 identify an object of particular interest, instead of specific traits of the physical object 110. For example, embodiments may recognize the presence of a piece of equipment that is in the field of view of the cameras 120, 130, 140. In other embodiments, the computing device may instead recognize movement in the video data that exceeds certain thresholds. The computing device may detect multiple predetermined traits in video data. This is particularly true in situations such as casinos, construction sites, and retail stores where it is desirable to monitor multiple physical objects 110. In a casino, for example, the object motion detected in the video data may be related to casino patrons, dealers, wait staff, and other individuals as well as the dice, cards, and chips being used by game participants. As a further example, at construction sites, it is desirable to monitor the locations of workers, equipment, and materials. In another example, it is desirable in retail stores to monitor the location of customers, store workers, and products being sold for purposes of advertising and inventory control. Additionally, when employed to secure certain areas such as restricted airspace, it is desirable to monitor the location of any possible intruder in addition to the location of any authorized individuals or vehicles. In each of these example scenarios, the video data from the cameras 120, 130, 140 contain predetermined traits that can be used by the techniques described here to monitor the location of multiple items of interest. In certain embodiments, the detection of predetermined traits may be combined with the ability to recognize certain objects. For example, in a casino, the cameras 120, 130, 140 may recognize the dice as an object and detect certain motions from casino patrons and dealers.

In at least some embodiments, the predetermined traits being monitored by the cameras 120, 130, 140 may be based on additional information being supplied by other types of sensors that are not full motion video cameras. This is desirable when these other sensors can provide information such as the presence of an object in a particular area, but where a more precise determination of the location of the object is desired. For example, a light beam that is used to secure a particular entrance may indicate that an object has entered through the entrance, but the specific location of the object is unavailable from the corresponding light beam sensor. In such an embodiment, the cameras 120, 130, 140 would be used to determine the location of the object after entering through the entrance. In other embodiments, there may be an indication that a particular type of object has entered a monitored area. For example, a transponder signal may be detected that indicates a large aircraft has entered a particular area. Using this information, such embodiments may adjust the predetermined traits that are to be identified by the cameras so that the location of the appropriate object is identified. Such an adjustment may occur when, for example, the cameras are initially configured to identify the location of small personal drones instead of large aircraft. The predetermined traits being monitored are tailored for the type of camera being used. For example, an infrared camera observing an area may use a predetermined trait of a heat signature approximating a warm-blooded mammal. In certain embodiments, particularly when the cameras 120, 130, 140 can perceive wavelengths that are not perceivable by humans, the cameras 120, 130, 140 will use signals contained in the light in a particular area and defined by a standard to interpret information that is being broadcast using the light, and with this information perform native location detection. Such a standard may include Li-Fi which, for example, is a wireless communication technology that relies on light in different frequencies as the medium for transmitting information. In certain embodiments, the light may be of the infrared or near-ultraviolet portion of the spectrum which is particularly suited for the transmission of large amounts of information at high speeds.

In at least some embodiments, video processing libraries such as OpenCV may be employed to facilitate the processing of video data. These libraries include a collection of methods, functions, or their equivalents that can be utilized by ordinarily skilled artisans to create a series of steps that are performed on the video data. By leveraging such existing video processing libraries with functions tailored for video, the predetermined traits that are desirable in the video data may be more quickly identified without requiring the independent recreation of algorithms in common use. In other embodiments, a combination of existing video processing libraries may be coupled with independently developed algorithms to provide a more accurate identification of predetermined traits in the video data. For example, OpenCV may perform a first series of operations on the video data, and then a customized motion detection library with independently developed algorithms may be employed to perform a second series of operations on the video data to identify the predetermined traits. Such independently developed algorithms may be tailored for certain types of full motion video cameras, for example. In one example, OpenCV is employed to perform the initial detection of faces in the video data, and a customized facial recognition algorithm is executed using the faces detected by OpenCV so that certain individuals may be recognized. Once the customized facial recognition algorithm confirms the individual is recognized a subsequent facial recognition algorithm included with OpenCV may be executed so that, for example, the movement of the individual through an area is tracked.

Certain aspects of the video data will need to be excluded from consideration by the cameras 120, 130 140. For example, jitter, compression or recording artifacts, or other noise contained in the video data should be not be identified as a predetermined trait that is to be surrounded by the two-dimensional shape. Other techniques for excluding certain aspects of video data may be included in, for example, video processing libraries such as OpenCV. For example, when employed for observing a parking lot, aspects of the video would ignore objects such as leaves or other refuse that are blown across the field of view, live precipitation, and other information that is distinguishable from the movement of larger objects such as cars, trucks, and individuals through the area. Such ignored objects may be identified by the size of the pixel groupings and the rate at which the pixel groupings change and move through the field of view. In another example, when monitoring a hallway, a maintenance person may appear in the field of view and may need to be ignored until the person leaves the field of view. In one embodiment of the system, such a maintenance person is ignored while in the field of view. Care must be taken, however, to monitor such ignored individuals, particularly in security applications. In certain embodiments, manual intervention may be required to confirm that certain persons or objects should be ignored. In still further embodiments, the aspects which are ignored may be specific to the particular application. As another example, the cameras may monitor an entrance where badges are not required to provide entry but rather facial recognition algorithms are used to recognize individuals. The cameras may ignore certain aspects of the video data such as objects that are smaller than a human, but must also consider information such as when an intruder attempts to follow a recognized individual into the entrance. In such an embodiment, the excluded portions of the video data cannot be so large as to allow intruders to enter the monitored area. These techniques may be employed prior to or after any attempts to identify predetermined traits, depending on the particular embodiment and characteristics desired in the particular embodiment such as emphasizing the speed at which predetermined traits are identified or emphasizing the accuracy with which the predetermined traits are identified.

In at least some embodiments, the cameras 120, 130, 140 are in a fixed location so motion of objects in the video data can be detected using conventional techniques. In certain embodiments, the cameras are attached to vehicles or devices that are in motion. In such embodiments, the motion of the camera must first be removed from the video data. This may be performed by using location information from the vehicles or devices in motion to eliminate certain motion contained in the video data. For example, location information such as a new GPS value, barometric measurement, accelerometer or gyroscope measurement, or magnetometer change may be used to remove motion contained in the video data, or may be associated with the particular frame or frames in the video data so that the motion in the video may be later removed. In still further embodiments, the cameras may include the ability to pan, zoom, and otherwise adjust the field of view being observed. In such embodiments, the motion of the cameras and adjustments to the field of view must also be eliminated from the video data. An example of such an algorithm for removing the motion from video data is termed "Cinema Stabilization" and is employed by Instagram to help minimize camera shake based on the movements of the smartphone as detected by the accelerometers contained in the smartphone.

Once the predetermined traits in the video data are identified, the portion of the video frame that contains the identified predetermined trait is demarcated with a two-dimensional shape. The two-dimensional shape can be of any form, but as shown in FIG. 2, for example, is preferably a polygon 150. The two-dimensional shape may instead be a circle, ellipse, or other form that is easily defined and represented. In at least some embodiments, the two-dimensional shape may be an outline of the object in the video data. Such embodiments may be employed where the accuracy provided by an outline of the object is more beneficial than the reduced performance associated with the generation of the outline of the object. The demarcated area 150 of the video frame need not be precisely limited to the position of the identified predetermined trait, particularly when such precise limiting requires additional processing and/or time. Instead of continuing to analyze the video data to precisely demarcate the identified predetermined traits, embodiments may instead use a larger two-dimensional shape 150 to demarcate the predetermined traits. For example, if additional processing time would reduce the two-dimensional shape 150 by 40%, such additional processing may be skipped and the larger two-dimensional shape 150 accepted. In some embodiments, it is desirable to execute the technique in a manner that provides a near real-time latency so that the location of the object can be determined and any remedial action may be executed. In certain embodiments, if additional processing time would compromise the ability to perform remedial action, the system may ignore certain frames of video data and instead interpolate the location of the object using the location derived from the frames of video data that are considered. By relying on such a larger two-dimensional shape 150, the processing performed on data from each camera can be reduced without significantly reducing the overall accuracy of the technique. In at least some embodiments, the dimensions of the two-dimensional shape 150 are proportional to the size of the image sensor being used in the camera. The dimensions of the two-dimensional shape 150 may, however, vary depending on the number of predetermined traits identified in the video data, and vary depending on the actual size of the predetermined traits being observed in the video data. In other embodiments, the dimensions of the two-dimensional shape 150 do not have any relationship with the image sensor being used. Instead, in such embodiments the two-dimensional shape 150 is based on the available field of view for the camera and the distance of the predetermined traits from the camera. In certain embodiments, however, such additional processing is desired so that the predefined trait is appropriately demarcated. Such an embodiment may include the ability to vary the demarcation of the predefined trait in comparison with the demarcation of a recognized object as appropriate. For example, in such an embodiment, the predetermined trait of motion observed in a camera's field of view may be demarcated with a two-dimensional shape that is less precisely limited than an object that is recognized using indicia that is in the same camera's field of view.

Associated with the two-dimensional shape 150 is geospatial information that represents the position and orientation of the camera acquiring the video signal. For example, the video data contained in the video signal from camera 120 contains geospatial information that represents the position and orientation of camera 120 at a particular moment in time, the video data contained in the video signal from camera 130 contains geospatial information that represents the position and orientation of camera 130 at a particular moment in time, and the video data contained in the video signal from camera 140 contains geospatial information that represents the position and orientation of camera 140 at a particular moment in time. In some embodiments, timestamp information is also associated with the two-dimensional shape 150. Embodiments may associate this and other information with the two-dimensional shape 150 by storing the shape information in a file along with the geospatial and/or timestamp information. In other embodiments, the geospatial and/or timestamp information is stored separately from the information defining the two-dimensional shape 150 such as in a database or a separate file, but the geospatial and/or timestamp information is easily reassociated with the two-dimensional shape 150. Embodiments may store the two-dimensional shape 150, along with any relevant information, in a scalable vector graphics (SVG) file or another commonly used file type that is readily processed.

Once the predetermined traits are demarcated by the two-dimensional shape 150, a three-dimensional shape 160 is defined that extends from at least the two-dimensional shape 150 to the camera 120, 130, 140 that captured the predetermined traits. FIG. 3 depicts one example of such a three dimensional shape 160. As shown in FIG. 3, the three-dimensional shape 160 extends from the camera 140 out towards the two-dimensional shape 150 in a manner that includes the two-dimensional shape 150 but extends beyond a plane defined by the two-dimensional shape 150. The three-dimensional shape 160 extends along an axis defined by the camera 140. The extent to which the shape 160 extends from the camera 140 and past the two-dimensional shape 150 may be defined automatically or may be configured for particular situations. For example, embodiments may be configured to begin the shape 160 from a surface of the lens of the camera 140 outward and ending a predetermined distance past the plane defined by the two-dimensional shape 150. Embodiments may also be configured to begin the shape 160 from a point at which the lens focuses the light onto a sensor and outward to a predetermined distance past the plane defined by the two-dimensional shape 150. Certain other embodiments may be configured to begin the shape 160 at a position that corresponds to the focal point of the lens in front of the camera. In such embodiments, the beginning of the shape 160 may be considered the origin of a coordinate system from which the position of the physical object 110 is determined. Various different configurations of the beginning and end points of the shape 160 are contemplated to help improve the accuracy of the determined location, and may vary depending on the particular camera being used, but the specific configurations are not enumerated here. In addition, the three-dimensional shape 160 need not be extruded only on the axis defined by the camera 140. For example, when the object 110 is not centered in the video frame, the three-dimensional shape 160 may be skewed towards the object 110.

The three-dimensional shape 160 may take the form of any shape that can be represented in a manner that does not approach the bandwidth and processing requirements necessary to transfer video data. In at least some embodiments, the shape 160 will taper in some manner towards the location of the camera. In other words, the shape 160 increases in size as it extends away from the camera towards the two-dimensional shape 150 and beyond the plane defined by the two-dimensional shape 150. In some embodiments, the shape 160 may be a modification of a cone where an apex of the cone is positioned approximately at the camera and where the base of the cone extends a predefined distance beyond the plane defined by the two-dimensional shape 150 that is encompassing the predetermined traits in the video data. In other embodiments, the shape 160 may be a combination of different shapes. This may occur when, for example, the two-dimensional shape 150 is that of a polygon and the embodiment has been configured so that a modification of a cone is used as the three-dimensional shape 160. In such a circumstance, the cone 160 may simply be modified to encompass the polygonal two-dimensional shape 150. In other embodiments, the cone 160 may take at least a partially polygonal shape so that the two-dimensional shape 150 is encompassed.

The rate at which the shape 160 expands from the beginning point to the end point may vary depending on the characteristics of the particular camera being used. In at least some embodiments, the rate of expansion from the beginning point to the end point varies based on the focal length of the camera. The rate of expansion of the shape 160 need not be linear and may vary in a manner that provides a better determination of the location of an object using the video data from the full motion video cameras. For example, the rate of expansion of the shape 160 may take a curve that increases the expansion rate of the shape at a location proximate the two-dimensional shape 150.

The three-dimensional shape 160 may be defined using existing functions in video processing libraries or may be defined by using other techniques, such as trigonometric processes. An example of such a trigonometric process in an embodiment where the beginning of shape 160 starts at a position corresponding to the focal point of the lens in front of the camera will now be described. FIG. 3B depicts the three-dimensional shape 160 along with the two-dimensional shape 150 that serves as a boundary around the predetermined traits in the video data. In such an embodiment, a first plane 162 defining a surface closest to the camera is specified, where the first plane 162 is a certain distance from the camera at a particular location. A notional distance of the two-dimensional shape 150 is also specified by, for example, a computing device where the points defining the two-dimensional shape 150 provide a boundary around the predetermined traits in the video data. A second plane 164 is also defined that is furthest from the camera, where the second plane 164 is a certain distance from the notional distance of the two-dimensional shape 150 and where the certain distance is specified for the camera at a particular location. It should be appreciated that the first plane 162 and second plane 164 are defined to have certain distances based on the camera operating at a particular location. For example, cameras of the same type may have different certain distances defined based on the particular location the camera is operating. Similarly, cameras at the same location may have different certain distances defined based on the type of camera being used. To determine the coordinates of the first plane 162 and the second plane 164 in a system where the camera serves as the origin of the coordinate system, the field of view angle of the lens being used by the camera is considered in trigonometric calculations. For example, the field of view angle of the lens of the camera may be provided to trigonometric functions and multiplied by the certain distances at which the first plane 162 and the second plane 164 are defined to calculate the specific coordinates that define the first plane 162 and the second plane 164 of the geometric shape 160.

Once the three-dimensional shape 160 has been defined, information regarding this shape 160, along with other information such as the geospatial information representing the position and orientation of the camera, timestamp information, camera focal length information, and other relevant information is stored for further processing. In at least some embodiments, a commonly used file type such as Extensible Markup Language (XML) is used to store this information. A two-dimensional shape 150 and a three-dimensional shape 160 may be defined and stored for each camera 120, 130, 140 that observes the predetermined traits. In other embodiments, the two-dimensional shape 150 may not be defined and stored for each camera 120, 130, 140 because the information provided by the three-dimensional shape 160 is sufficient to help provide a determination of a location of the object 110.

The processing to perform the steps of identifying predetermined traits in the video data, excluding certain aspects of the video data, defining the two-dimensional shape 150, and defining the three-dimensional shape 160, and other described aspects may be performed by a computing device that is part of each individual camera, part of a shared resource that may be used by a plurality of cameras, or part of a shared resource that is used by the plurality of cameras and other aspects of the system. Certain embodiments may perform some of these tasks in the camera prior to transmitting data to the computing device so that the amount of data being transferred from the cameras to the computing device is minimized. This may be particularly true for certain processing aspects such as the exclusion of certain aspects of the video data. The full motion video cameras of these embodiments may therefore include a computing device with sufficient processing capability to perform these processing aspects prior to transmission of video data. The computing devices of such an embodiment may perform other tasks in addition to defining the shapes 150, 160 such as including geospatial information and timestamps with the shapes 150, 160. In other embodiments, each of the cameras may be of a closed-circuit video monitoring type that can only provide video data but do not perform any processing. In such an embodiment, a separate computing device performs the needed processing on the video data so that a determination of an object's location may be performed. In some embodiments, the separate computing device may directly receive the video data and perform processing prior to storing the video data and shape data. In other embodiments, the separate computing device may retrieve the video from a video storage system and then perform the processing to define the shape data. Variations of the allocation of computing devices in the system are possible and are not specifically enumerated here.

As can be appreciated from the depiction in FIGS. 3A and 3B, defining one three-dimensional shape 160 only provides some information regarding the location of the physical object 110. For example, by having only one three-dimensional shape 160, it is difficult to discern at what location along the shape 160, the object 100, and the two-dimensional shape 150 are located.

Figure 4:
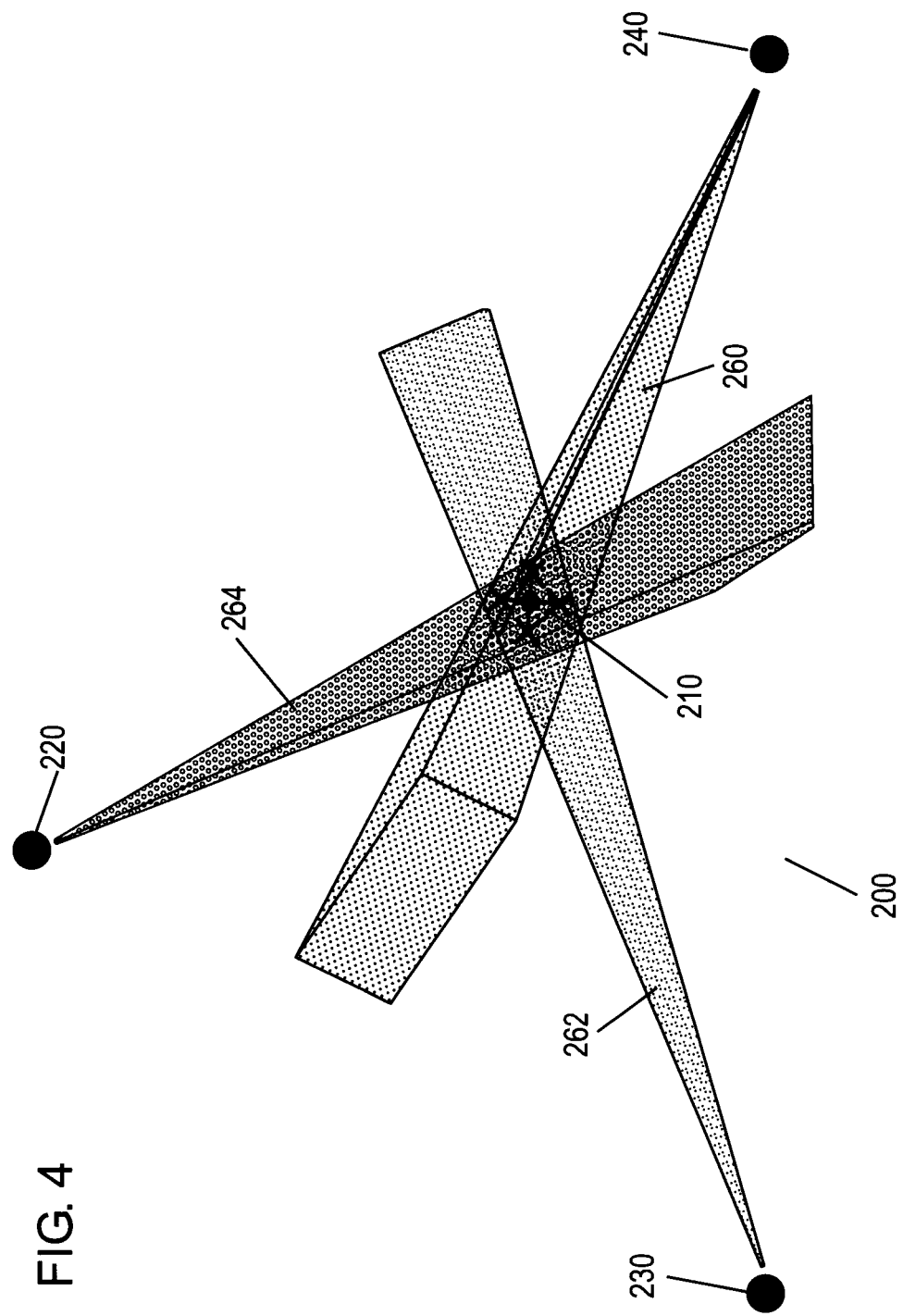
FIG. 4 depicts an embodiment of the system, a physical object, and multiple three-dimensional shapes.

FIG. 4 depicts an embodiment of the system 200 that includes three cameras 220, 230, 240 that each have a view of the physical object 210. Although not specifically depicted, a two-dimensional shape was defined from the viewpoint of each of the cameras 220, 230, 240, and using this two-dimensional shape each of the three three-dimensional shapes 260, 262, 264 are defined. As shown in FIG. 4, there exists an area where each of the three three-dimensional shapes 260, 262, 264 intersect each other, and the physical object 210 is located in this area being observed by the cameras 220, 230, 240. As can be appreciated from this depiction, additional cameras would allow for additional two-dimensional shapes to be defined and for additional three-dimensional shapes to be defined. These additional three-dimensional shapes are likely to reduce the areas where the three-dimensional shapes intersect, and therefore improve the determination of the location of the object 210.

Figure 5:
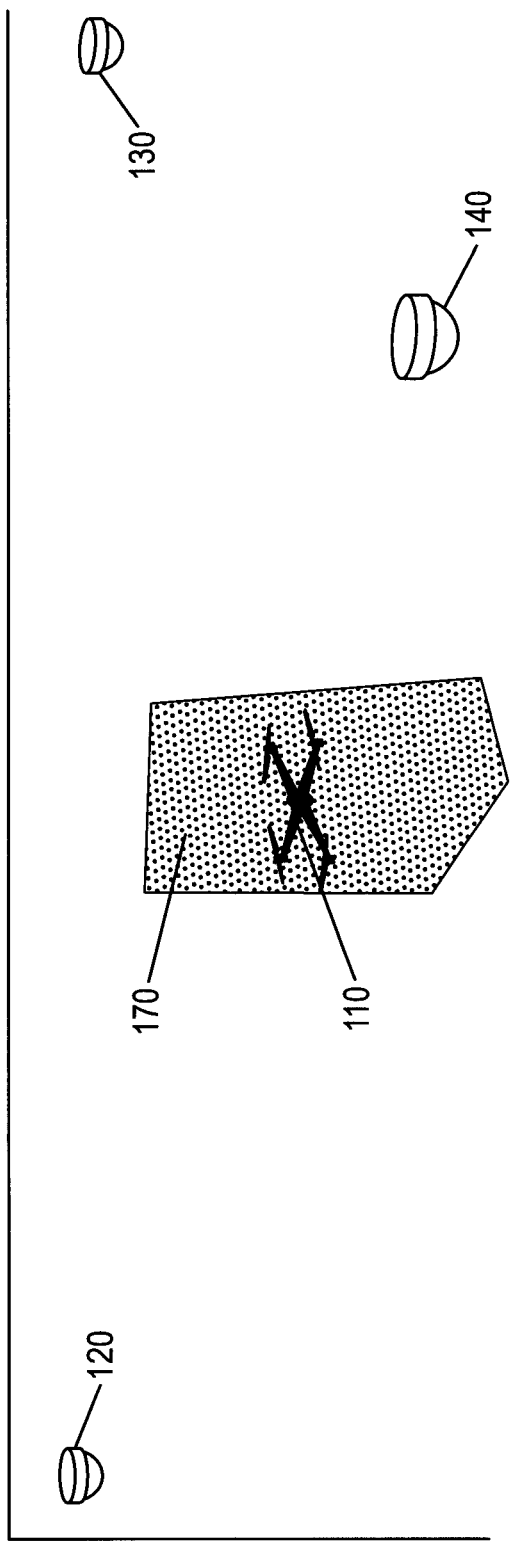
FIG. 5 depicts an embodiment of the system, a physical object, and an intersecting shape.

FIG. 5 depicts an intersecting shape 170 that is the result of the application of an intersect function to the three-dimensional shapes that are defined based on the ability of the cameras 120, 130, 140 to maintain the physical object 110 in the field of view. As discussed above, the three-dimensional shapes are defined for each camera 120, 130, 140 and this information is saved along with other information such as geospatial information representing the position and orientation of the camera, timestamp information, camera focal length information, and other relevant information. To calculate the intersecting shape 170, an intersecting function is executed on the multiple three-dimensional shapes so that the portions of the three-dimensional shapes that intersect each other are identified. In at least some embodiments, the intersecting function provides a result where the intersecting shape 170 defines a three-dimensional shape where all of the three-dimensional shapes intersect. In other embodiments, the intersecting function may provide a result where all but one of the three-dimensional shapes intersect. Such an intersecting function may be desirable when the configuration of cameras tends to result in at least one three-dimensional shape that is aligned in a manner that does not intersect the three-dimensional shapes defined by the other cameras. Such a situation may arise when, for example, one camera may be temporarily obstructed from having a direct view of the object 110. In still further embodiments, the intersecting function may vary the weight associated with the three-dimensional shapes defined by particular cameras. For example, one camera may have a particularly desirable placement where the three-dimensional shapes defined are more accurate and should be relied upon more heavily than the three-dimensional shapes defined by other cameras. In other scenarios, the three-dimensional shapes defined by one camera may be less accurate than the shapes defined by other cameras, and so the intersecting function may rely less on the shape defined by this camera. Other modifications of the intersecting function are possible but not specifically enumerated here.

The intersecting function must be executed on multiple three-dimensional shapes that were generated from contemporaneous video data. This is so that the observations by the cameras are synchronized with each other and with the position of the object to be located. Prior to executing the intersecting function, a computing device will obtain the available three-dimensional shapes associated with each camera that observed the object. The computing device then uses the shapes associated with each camera for a particular moment in time and determines an intersecting shape for these shapes. After defining the intersecting shape, a center point of the intersecting shape is calculated and then used as the determined location of the physical object for the moment corresponding to the video frame from which the shapes were derived.

The defined center point of the intersecting shape may be stored for use by the system at a later time, or for use by third-party systems. The three-dimensional shapes used to define the intersecting shape may also be stored for use by the system at a later time, or for use by third-party systems. This may be desirable when, for example, the third-party systems have differing tolerances for determining the location of the object. Accordingly, these third-party systems can instead rely on the three-dimensional shapes to execute their own intersecting function to determine the location of the physical object. Although such a third-party system would need to include sufficient processing power to perform the needed calculations, no video data would need to be transferred to the third-party system. Instead, a representation of the three-dimensional shape may be transferred, along with needed geospatial information and other information, to the third-party. Moreover, in situations where the contents of the video data may be confidential or otherwise sensitive, the third-party system need not be entrusted with properly securing and storing the video data.

The information may be provided to third parties using an application programming interface (API), through the use of a data feed, through the use of a shared database, or other conventional techniques. In each instance, the system or the third party need not consider the video data from which the shapes were derived and can instead rely on the shapes that were defined by the above-described process.

Figure 6:
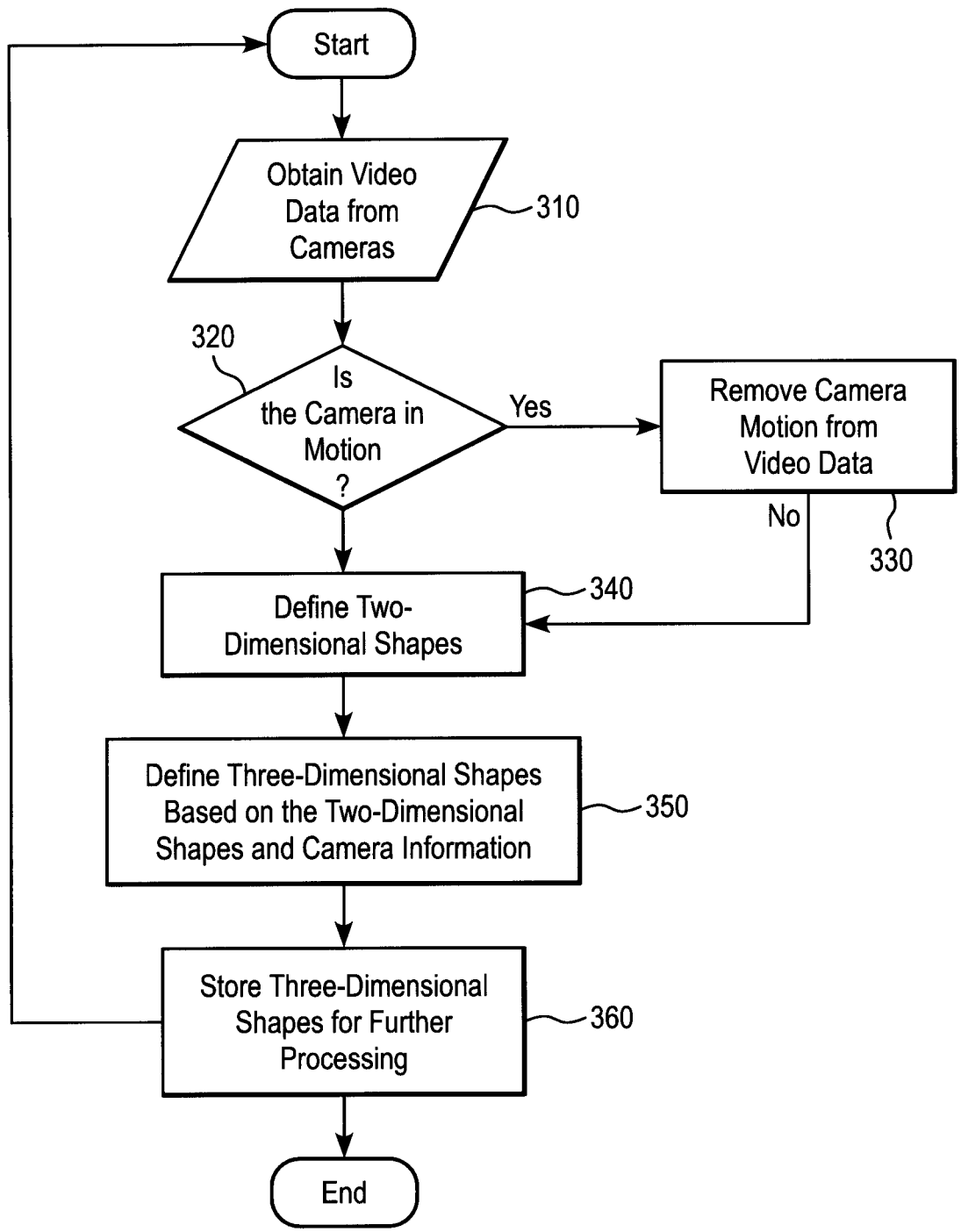
FIG. 6 depicts the process of defining and storing the three-dimensional shapes.

FIG. 6 depicts one embodiment of a process by which the three-dimensional shapes are created based on video data from full motion video cameras. The video data is obtained from the cameras (step 310). As described above, a plurality of cameras are desirable so that multiple three-dimensional shapes can be used to determine the location of the object. It is determined if the camera is in motion (step 320). If so, the motion of the camera is removed from the video data if sufficient data regarding the camera's position and orientation are available (step 330). For example, if the camera has recorded its position and/or orientation contemporaneously with the recording of video data, algorithms may be employed to remove this movement from the video frame (step 330). An example of such an algorithm is termed "Cinema Stabilization" and is employed by Instagram to help minimize camera shake based on the movements of the smartphone as detected by the accelerometers contained in the smartphone. Other algorithms may be executed against the video data to further clarify the data and remove any extraneous information. Two-dimensional shapes are then defined that surround predetermined traits contained in the video data (step 340). These two-dimensional shapes, as described, can be of any form and may vary in size. In at least some embodiments, the size of the two-dimensional shapes varies based on the dimensions of the camera lens face. Using these two-dimensional shapes, three-dimensional shapes that extend along the camera axis to the object are defined (step 350). In at least some embodiments, the angular expansion of the three-dimensional shape from the camera to the plane of the two-dimensional shape is based on the focal length of the camera lens. Once the three-dimensional shapes are defined, the three-dimensional shapes are stored (step 360) for further processing.

As discussed, the steps depicted in FIG. 6 may be performed by each camera, by a shared resource utilized by each camera, or by a centralized system that performs the processing on the video data supplied by the cameras. The cameras need not use a homogeneous configuration and instead a heterogeneous mix of cameras may in some circumstances be employed. For example, certain cameras may include the processing capabilities to perform the steps shown in FIG. 6 and simply transmit the three-dimensional shapes for storage while other cameras only supply video data for a centralized system that performs the same processing. In either instance, the result from processing the video data is the same and the three-dimensional shapes are stored for further processing. Regardless of the specific hardware implementation, such a computing device configured to define the three-dimensional shapes will perform the above described aspects of the process.

Figure 7:
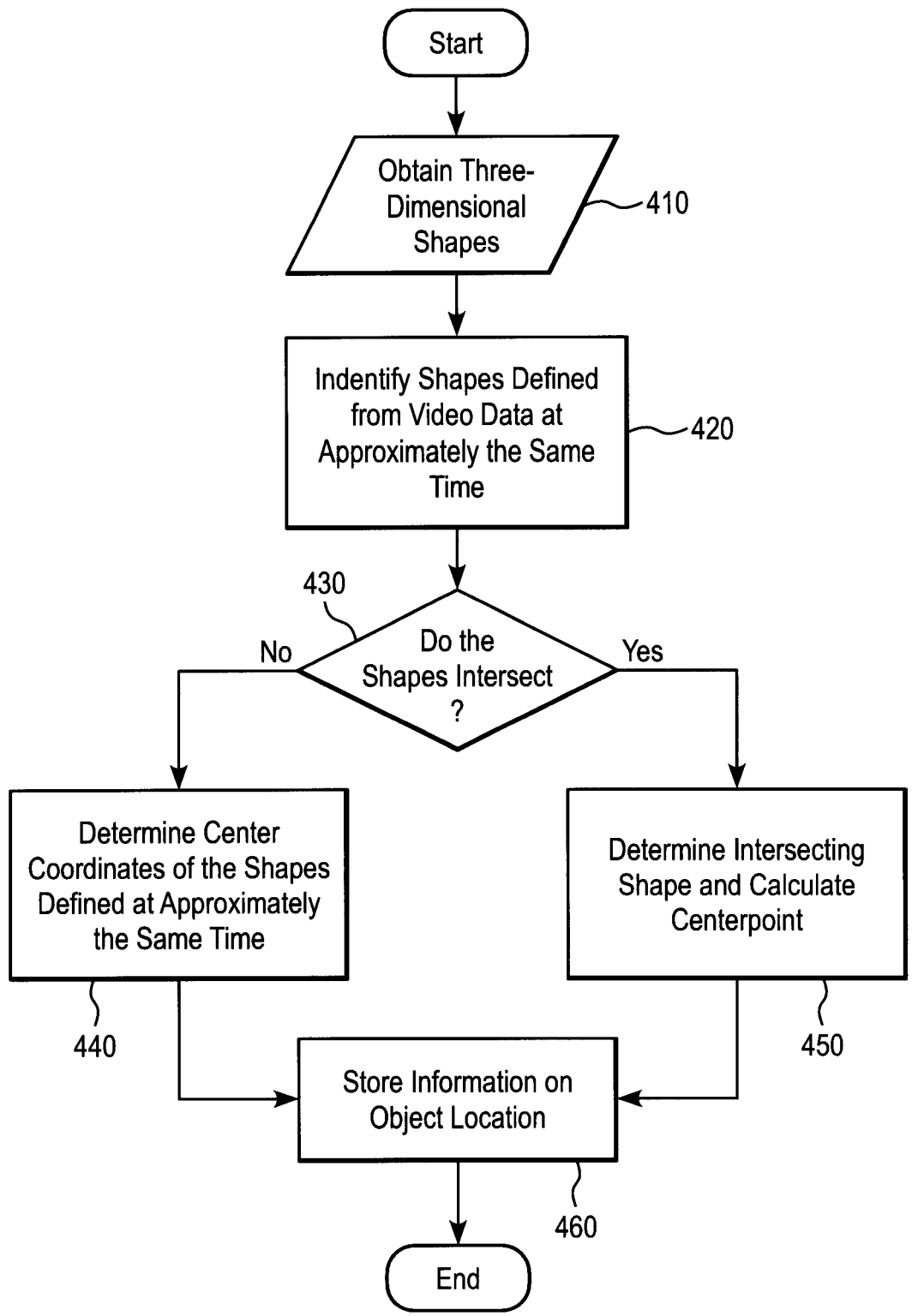
FIG. 7 depicts the process of determining the intersecting shape.

FIG. 7 depicts an embodiment of a process which processes the stored three-dimensional shapes that were created based on the video data from full motion video cameras. The three-dimensional shapes that were stored previously (step 360) are obtained by a computing device (step 410). Unlike the computing device that processed the video data, the computing device that processes the stored three-dimensional shapes, or intersecting shape computing device, need not consider the video data but can instead use the stored three-dimensional shapes to determine the location of the physical object. By operating on the stored three-dimensional shapes, the computing device that processes the stored three-dimensional shapes does not require the bandwidth and storage capacity to process video data obtained from a plurality of full motion video cameras.

The three-dimensional shapes may be stored in separate files, in a database, or in any other appropriate format. Using the stored three-dimensional shapes, the computing device identifies the shapes that correspond to the same or approximately the same timeframe (step 420). This may be done by, for example, obtaining the shapes that correspond to video frames with a certain timestamp. In other embodiments, the video frames lack an embedded time stamp and the computing device relies on other information to determine the shapes that were defined at approximately the same time. For example, when multiple cameras begin providing video data at the same time, the computing device may rely on the number of video frames that were created to approximate the timestamp. This is possible when the cameras all generate video data with the same frames per second. Other techniques for identifying the shapes that were defined from video data at approximately the same time are possible but not specifically described here.

Once the three-dimensional shapes defined from the video data at approximately the same time are identified, it is determined if the shapes intersect with each other (step 430). As described, an intersecting function may be used to define an intersecting shape where all of the three-dimensional shapes intersect. In other embodiments, the intersecting function may define an intersecting shape where only most or some of the three-dimensional shapes intersect. In still further embodiments, the intersecting function may apply different weights to the three-dimensional shapes depending on the camera from which the three-dimensional shape was defined. If it is determined that the shapes do intersect and an intersecting shape is defined, the center point of the intersecting shape is found (step 450). If, however, it is found that insufficient numbers of the three-dimensional shapes intersect, then other techniques may be used to identify the location of the object for the specific time. For example, the center of the plurality of shapes that were generated at approximately the same time may be utilized to provide an approximate location of the object (step 440). In other situations and embodiments, the shape data may not be utilized as reliable data for the determination of the location of the object. For example, the area where the shapes intersect may be relatively large so the location of the object cannot be readily determined, but the area is nevertheless useful because it limits the possible location of the object to be in a subset of a larger area. In some embodiments, this information is then used to further refine the determination of the location of the object. When location information is derived from the shapes, whether the shapes are intersecting (step 450) or whether the shapes are not intersecting and an approximation is being made (step 440), the location information is stored for the object (step 460).

The stored location information may then be used by other third parties. For example, the third parties may be supplied location information through an updating feed. In other embodiments, third parties may access the location information through an application programming interface, through files that are generated from the location information, or through a database storing the location information. In some embodiments, the computing device that determines the location of the object may emit notifications to indicate that additional location information is available or may broadcast additional location information to subscribers as the information is being determined.

In addition to supplying information to third parties, the techniques described here may be triggered as a result of third party systems. For example, another system may employ radio frequency systems to determine when an object is within the vicinity. These radio frequency systems would then notify a system employing the described techniques to use full motion video cameras to provide a determination of the location of the object based on observations from full motion video cameras.

Figure 8:
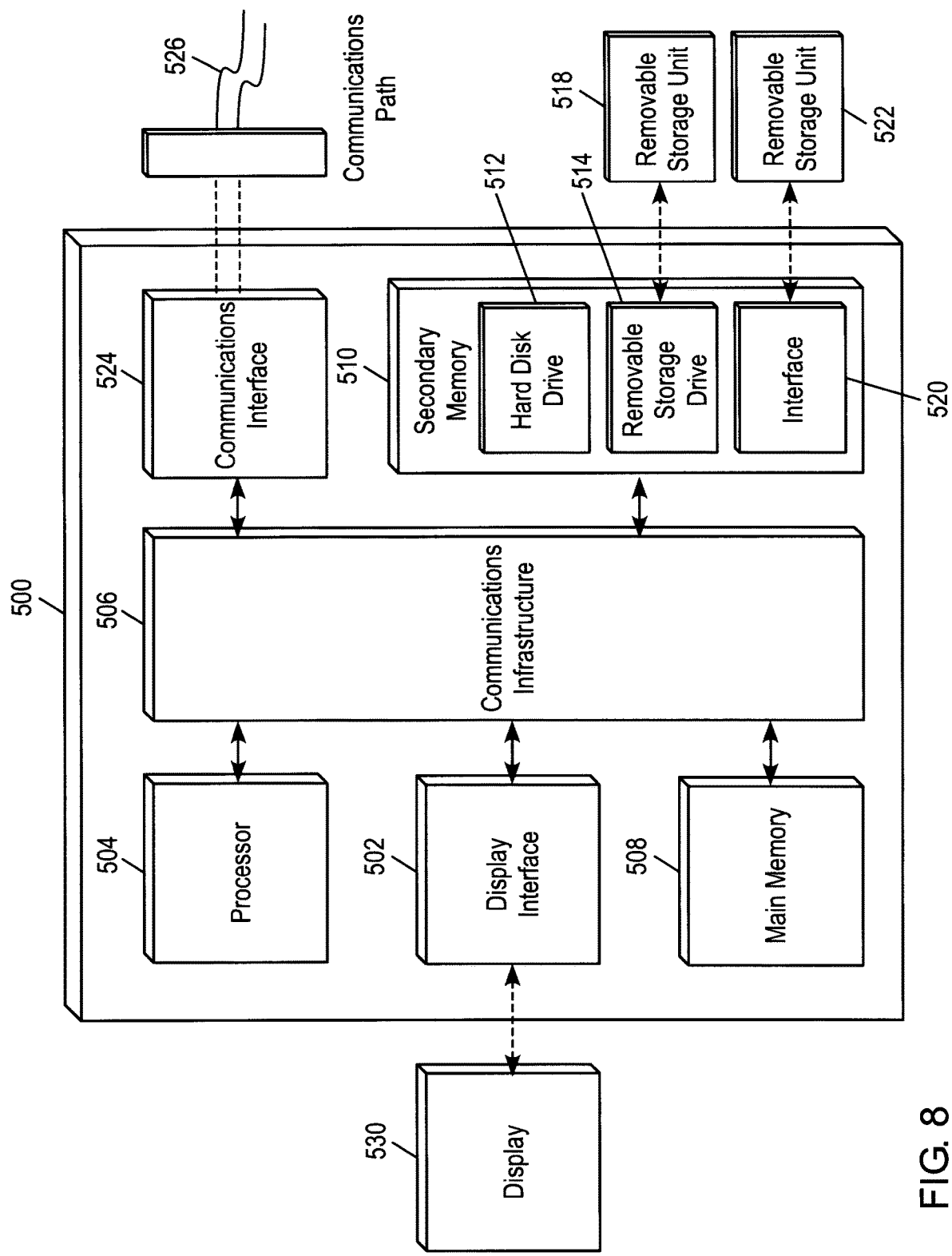
FIG. 8 depicts an embodiment of a computing device.

FIG. 8 illustrates a computer system 500 in which embodiments of the present disclosure, or portions thereof, may be implemented as computer-readable code. For example, the processes shown in FIGS. 6 and 7 may be implemented in the computer system 500 using hardware, software, firmware, and/or non-transitory computer readable media having instructions for performing the tasks describe for the process. Hardware, software, or any combination thereof may also perform the processes and techniques described in this disclosure.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

The terms "computer program medium," "non-transitory computer readable medium," and "computer usable medium" as discussed herein are used to generally refer to tangible media such as a removable storage unit 518, a removable storage unit 522, and a hard disk drive 512. The computer system 500 may also include a main memory 508 (e.g., random access memory, read-only memory, etc.), and may also include a secondary memory 510. The secondary memory 510 may include the hard disk drive 512 and a removable storage drive 514 (e.g., a floppy disk drive, a magnetic tape drive, an optical disk drive, a flash memory, etc.).

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art. The secondary memory 510 may also include an array of such means, such as an array of hard disk drives, flash memory, etc.

A processor unit or device 504 as discussed herein may be a single processor, a plurality of processors, or combinations thereof. Processor devices may have one or more processor cores. Processor device 504 may be a special purpose or a general purpose processor device specifically configured to perform the functions discussed herein. The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

The processor device 504 may be connected to a physical communications infrastructure 506 that transmits communications. The physical communications infrastructure 506 allows for a bus, message queue, network, multi-core message-passing scheme, etc. to be implemented so that reliable transfer of messages and/or information with other components is possible.

Data stored in the computer system 500 (e.g., in the main memory 508 and/or the secondary memory 510) may be stored on any type of suitable computer readable media, such as optical storage (e.g., a compact disc, digital versatile disc (DVD), Blu-ray disc, etc.), solid state media (e.g., memory cards, flash drives, etc.), magnetic tape storage, hard disk drives, or other suitable media. The data may be configured in any type of suitable configuration, such as a database, flat file, etc. Suitable configurations and storage types will be apparent to persons having skill in the relevant art.

The computer system 500 may also include a physical communications interface 524. The communications interface 524 provides the physical link that allows software and data to be transferred between the computer system 500 and external devices. A network is established over this physical communications interface 524 and may be any type of network suitable for performing the functions as disclosed herein including a wired or wireless local area network (LAN), a wired or wireless wide area network (WAN), a mobile communication network, a satellite network, the Internet, fiber optic, coaxial cable, infrared, radio frequency (RF), or any combination thereof. Other suitable network types and configurations will be apparent to persons having skill in the relevant art.

Exemplary communications interface 524 may include a modem, an Ethernet network interface, a fiber optic communications port, a Wi-Fi-compliant antenna, a Bluetooth interface, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, electronic ink, etc.

Computer program medium and computer usable medium may refer to memories, such as the main memory 508 and secondary memory 510, which may be memory semiconductors. These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter. This is particularly true for situations where a computing device is associated with an individual full motion video camera or several full motion video cameras. In such a situation, the computing device is tailored to only include the components to execute its tasks so that costs and complexity are minimized.

It should be appreciated that any of the components or modules referred to with regards to any of the present invention embodiments discussed herein, may be integrally or separately formed with one another. Further, redundant functions or structures of the components or modules may be implemented.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method of determining the location of objects, the method comprising:
    receiving information from a plurality of sensors monitoring an area;
    identifying, in data captured by respective first sensors of the plurality of sensors, one or more predetermined traits of a detected object;
    demarcating a portion of the captured data that contains the identified one or more predetermined traits with a two-dimensional shape;
    defining a three-dimensional shape for each first sensor that maintains the detected object in a field of view, the three-dimensional shape extending from at least the two-dimensional shape to the respective first sensor in each data frame;
    calculating an intersecting shape where two or more of the defined three-dimensional shapes of the first sensors intersect; and
    calculating a center point of the intersecting shape that is identified as the location of the object.

2. The method according to claim 1, comprising:
    receiving, from a second sensor of the plurality of sensors monitoring the area, data for determining which one or more predetermined traits is to be identified.

3. The method according to claim 1, wherein the step of receiving information from the first sensors comprises receiving video signals from at least two or more types of video sources.

4. The method according to claim 3, wherein each first sensor is a video camera and receiving video signals received from each first sensor comprises receiving camera position, azimuth, inclination, and focal length.

5. The method according to claim 3, wherein the step of identifying the one or more predetermined traits of a detected object comprises excluding data within the video signal captured by each first sensor based on a size of a pixel grouping and/or a rate of change of a respective pixel grouping.

6. The method according to claim 1, wherein the step of defining the three-dimensional shape comprises extending the three-dimensional shape from beyond a plane defined by the two-dimensional shape to the first sensor.

7. The method according to claim 6, comprising:
increasing a size of the three-dimensional shape in a direction away from the first sensor towards the three-dimensional shape and beyond the plane defined by the two-dimensional shape.

8. The method according to claim 1, wherein the step of calculating an intersecting shape comprises:
executing an intersecting function on the three-dimensional shapes so that a portion of the three-dimensional shapes that intersect each other are identified.

9. The method according to claim 8, comprising:
executing the intersecting function on three-dimensional shapes generated from contemporaneous data.

10. A system for determining the location of objects, the system comprising:
a plurality of sensors for monitoring an area; and
a computing device for locating an object, the computing device being configured to:
receive information from first sensors of the plurality of sensors;
identify, in data captured by respective first sensors of the plurality of sensors, one or more predetermined traits of a detected object;
demarcate a portion of the captured data that contains the identified one or more predetermined traits with a two-dimensional shape;
define a three-dimensional shape for each first sensor that maintains the detected object in a field of view, the three-dimensional shape extending from at least the two-dimensional shape to the respective first sensor in each data frame;
calculate an intersecting shape where two or more of the defined three-dimensional shapes of the first sensors intersect; and
calculate a center point of the intersecting shape that is identified as the location of the object.

11. The system according to claim 10, wherein the computing device is configured to identify the one or more predetermined traits based on information detected by a second sensor of the plurality of sensors.

12. The system according to claim 10, wherein two or more of the first sensors are video cameras of different types of video sources.

13. The system according to claim 10, wherein each first sensor is a video camera configured to include camera position, azimuth, inclination, and focal length in the video signal.

14. The system according to claim 10, wherein the computing device is configured to:
identify the one or more predetermined traits of a detected object by excluding data within a video signal captured by each first sensor based on a size of a pixel grouping and/or a rate of change of a respective pixel grouping.

15. The system according to claim 10, wherein the computing device is configured to:
define the three-dimensional shape by extending the three-dimensional shape from beyond a plane defined by the two-dimensional shape to the first sensor.

16. The system according to claim 15, wherein the computing device is configured to:
increase a size of the three-dimensional shape in a direction away from the first sensor towards the three-dimensional shape and beyond the plane defined by the two-dimensional shape.

17. The system according to claim 10, wherein the computing device is configured to:
execute an intersecting function on the three-dimensional shapes so that a portion of the three-dimensional shapes that intersect each other are identified.

18. The system according to claim 17, wherein the computing device is configured to:
execute the intersecting function on three-dimensional shapes generated from contemporaneous data.

* * * * *